(12) United States Patent
Preda et al.

(10) Patent No.: US 11,718,528 B2
(45) Date of Patent: Aug. 8, 2023

(54) PROCESS FOR THE PRODUCTION OF HIGH CONDUCTIVITY, CARBON-RICH MATERIALS FROM COAL

(71) Applicant: Physical Sciences, Inc., Andover, MA (US)

(72) Inventors: Dorin V. Preda, Medford, MA (US); Min K. Song, Newark, DE (US); Jake T. Herb, West Chester, PA (US); Christopher M Lang, Hampstead, NH (US); David P. Gamliel, Medford, MA (US)

(73) Assignee: Physical Sciences Inc., Andover, MA (US)

( * ) Notice: Subject to any disclaimer, the term of this patent is extended or adjusted under 35 U.S.C. 154(b) by 246 days.

(21) Appl. No.: 17/117,538

(22) Filed: Dec. 10, 2020

(65) Prior Publication Data

US 2021/0179432 A1    Jun. 17, 2021

Related U.S. Application Data

(60) Provisional application No. 62/946,521, filed on Dec. 11, 2019.

(51) Int. Cl.
*C01B 32/184* (2017.01)
*C10J 3/46* (2006.01)

(52) U.S. Cl.
CPC .............. *C01B 32/184* (2017.08); *C10J 3/46* (2013.01); *C01B 2204/22* (2013.01); *C01B 2204/30* (2013.01); *C01B 2204/32* (2013.01); *C01P 2004/03* (2013.01); *C10J 2300/093* (2013.01); *C10J 2300/1625* (2013.01)

(58) Field of Classification Search
CPC .............. C01B 32/184; C01B 2204/22; C01B 2204/30; C01B 2204/32; C10J 3/46; C10J 2300/093; C10J 2300/1625; C01P 2004/03; C10G 1/08
See application file for complete search history.

(56) References Cited

U.S. PATENT DOCUMENTS

2016/0347617 A1* 12/2016 Zhang ................. C01B 32/23
2020/0332197 A1* 10/2020 Ackerman ............ C10G 1/042

FOREIGN PATENT DOCUMENTS

WO   WO-2019055529 A1 *  3/2019  ............... C10G 1/02
WO   WO-2020186011 A1 *  9/2020  ........... C01B 32/184

OTHER PUBLICATIONS

Zhang, Haijun. "Effect of electrolyte addition on flotation response of coal." Physicochemical Problems of Mineral Processing 51 (2015).*
Miura, Kouichi. "Mild conversion of coal for producing valuable chemicals." Fuel processing technology 62.2-3 (2000): 119-135.*

(Continued)

*Primary Examiner* — Richard M Rump
(74) *Attorney, Agent, or Firm* — Iandiorio Teska & Coleman, LLP

(57) ABSTRACT

A method of producing high conductivity carbon material from coal includes subjecting the coal to a dissolution process to produce a solubilized coal material, and subjecting the solubilized coal material to a pyrolysis process to produce the high conductivity carbon material.

13 Claims, 4 Drawing Sheets

(56) References Cited

OTHER PUBLICATIONS

Newman, David S., Thomas H. Kinstle, and Gnanaraja Thambo. "The acylation of coal and model coal compounds in room temperature molten salts." ECS Proceedings vols. 1987.1 (1987): 991.*

Kennar, David R. "Effect of selective coal pretreatment methods upon low severity coal liquefaction and coal/oil co-processing, The." 1990-1999—Mines Theses & Dissertations (1990).*

N. Tsubouchi et al. "Carbon Crystallization during High-Temperature Pyrolysis of Coals and the Enhancement by Calcium" Energy Fuels 2003, 17, No. 5 1119-1125.

R. Q. Ye et al. "Coal as an abundant source of graphene quantum dots" Nature Comm. 2013, 4, 2943, seven (7) pages.

R. H. Schlosberg et al. "Effect of Friedel-Crafts alkylation on the caking properties of bituminous coal" Fuel 1978, 57, 424-126.

R. H. Schlosberg et al. "Alkylation: a beneficial pretreatment for coal liquefaction" Fuel 1980, 59, 45-47.

https://www.eia.gov/todayinenergy/detail.php?id=2670, Sub-bituminous and Bituminous Coal Dominate U.S. Coal Production, Aug. 16, 2011.

* cited by examiner

US 11,718,528 B2

PROCESS FOR THE PRODUCTION OF HIGH CONDUCTIVITY, CARBON-RICH MATERIALS FROM COAL

RELATED APPLICATIONS

This application claims benefit of and priority to U.S. Provisional Application Ser. No. 62/946,521 filed Dec. 11, 2019, under 35 U.S.C. §§ 119, 120, 363, 365, and 37 C.F.R. § 1.55 and § 1.78, which is incorporated herein by this reference.

GOVERNMENT RIGHTS

This invention was made with U.S. Government support under Contract No. DE-SC0018837 awarded by the Department of Energy (DOE). The Government has certain rights in the subject invention.

FIELD OF THE INVENTION

This invention relates, in one preferred embodiment, to the field of producing high value, carbon products from coal feedstocks. The process was demonstrated for both anthracitic and bituminous coal feedstocks which account for >45% of the coal found in the US.

BACKGROUND OF THE INVENTION

Prior processes to produce graphitic carbon-based materials from coal pose significant challenges associated with the substantial chemical modifications of the native coal carbon structures. These modifications are due to the use of either very high pyrolysis temperatures (>1000° C.) (see N. Tsubouchi et al., "Carbon Crystallization during High-Temperature Pyrolysis of Coals and the Enhancement by Calcium" *Energy Fuels* 2003, 17, 1119-1125 incorporated herein by this reference) or strong oxidizing reagents for prolonged time (sulfuric acid/nitric acid, 100° C., 24 hrs) (see R. Q. Ye et al., "Coal as an abundant source of graphene quantum dots" *Nature Comm.* 2013, 4, 2943, incorporated herein by this reference), factors that ultimately lead to poor process economics.

Alkylation of high volatility bituminous coal with isopropyl chloride has been reported to modify the caking properties and increase solubility. See R. H. Schlosberg et. al., "Effect of Friedel-Crafts alkylation on the caking properties of bituminous coal" *Fuel* 1978, 57, 424-426 and R. H. Schlosberg e. al., "Alkylation: a beneficial pretreatment for coal liquefaction" Fuel 1980, 59, 45-47 both incorporated herein by this reference.

BRIEF SUMMARY OF THE INVENTION

Featured in one example is a process that produces graphene-like (graphitic), high conductivity carbon material suitable, for example, for electrochemical applications. In addition, the process may generate valuable byproducts such as low emission fuels (e.g., methane) and a mineral fraction with potential for the recovery of trace elements (e.g., rare earth elements).

The problem of producing carbon-based, value added products from coal, is solved, in one preferred embodiment, by an economical, two-step process that produces a carbon product suitable for electrochemical applications. The two primary steps of the process are: (1) coal dissolution by catalytic isopropylation and (2) pyrolytic graphenization. Both steps of the process were demonstrated. The carbon product was demonstrated in battery electrode formulations. Techno-economic analysis indicated economic feasibility. Unlike previous processes, the approach builds upon the pre-existing coal structures to create high conductivity features under mild conditions.

Featured is a method of producing high conductivity carbon material from coal comprising subjecting the coal to a dissolution process to produce a solubilized coal material and subjecting the solubilized coal material to a pyrolysis process to produce the high conductivity carbon material.

In one example, the dissolution process includes adding one or more reagents, solvents and/or catalysts to the coal. The reagent/solvent may include iPrCl and/or the catalysts may include $AlCl_3$. The dissolution process preferably produces a mineral fraction in addition to the solubilized coal material. The pyrolysis process may include a gas combustor for applying heat to the solubilized coal material and then the pyrolysis process may produce a gas in addition to the high conductivity carbon material which is fed to the combustor as a fuel.

In one example, the pyrolysis process includes heating the solubilized coal material to between 250° C. and 380° C. for 1-8 hrs and then heating the solubilized coal material to temperatures as low as 700° C. for at least 1 hr. The high conductivity carbon material typically has a graphene-like morphology, a low mineral content, and a high surface area.

Also featured is a method of producing high conductivity carbon material from coal comprising subjecting the coal to a dissolution process to produce a solubilized coal material and subjecting the solubilized coal material to a pyrolysis process to produce the high conductivity carbon material and a fuel gas used in the pyrolysis process to heat the solubilized coal material.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
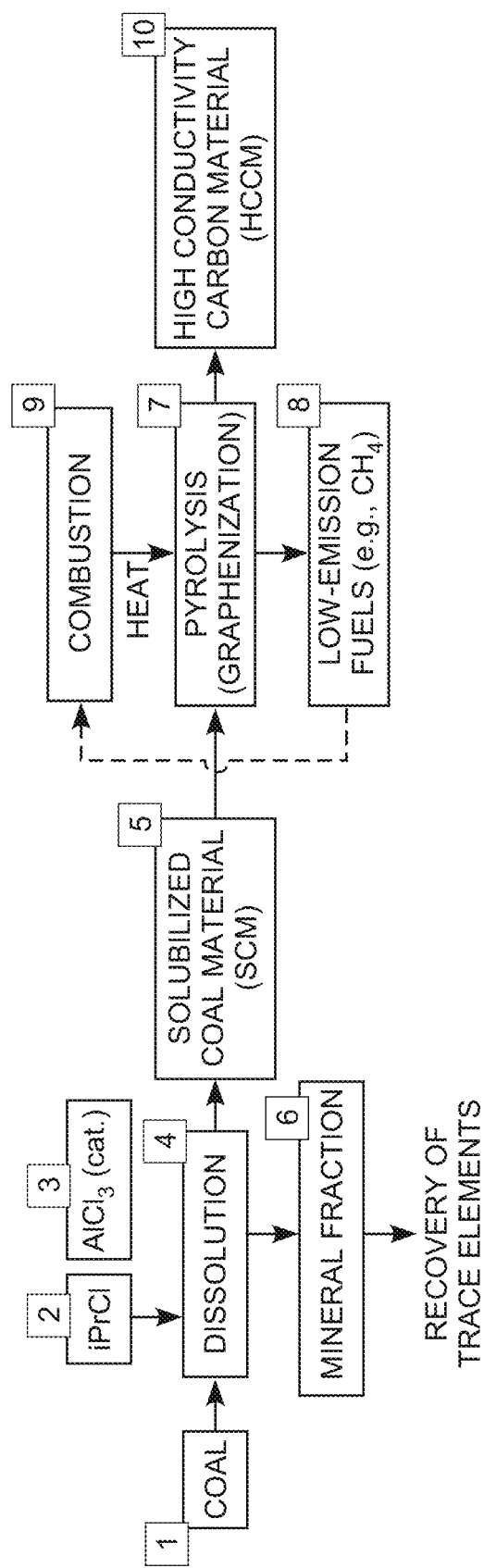
FIG. 1 is a flow chart depicting the primary steps associated with the production of graphene-like, high conductivity carbon material from coal in one example.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

The preferred process starts with the coal feedstock 1, FIG. 1 that is subjected to a dissolution step 4 using, for example, isopropyl chloride (iPrCl-2) as reagent/solvent and aluminum chloride ($AlCl_3$-3) as catalysts. The coal is presented to a chamber where the reagents/solvents and catalysts are also introduced. The mixtures are mixed for 1-24 hrs at temperatures ranging from 0° C. to 37° C. The products of this step are a solubilized coal material (SCM) 5 and a mineral fraction 6 that may be suitable for the recovery of trace elements. The solution of SCM is separated from the mineral fraction by filtration and the solvent is evaporated. The SCM intermediates are then subjected to pyrolysis/graphenization at step 7 that produces a high conductivity carbon material (HCCM) product 10 at temperatures as low as 380° C. A gaseous stream 8 is also produced comprising low emission fuels such as methane ($CH_4$). The low emission fuels can be used for combustion 9 to generate the heat needed for the pyrolysis step 7. The pyrolysis step can be performed using, for example, box furnaces or flow pyrolysis reactors. The pyrolysis step is preferably performed under inert atmosphere (e.g., argon, nitrogen). The pyrolysis step 7 may include heating the SCM material to between 250 and 380° C. for 1-8 hrs and then heating the SCM material to temperatures as low as 700° C. for at least 1 hr.

Figure 2:
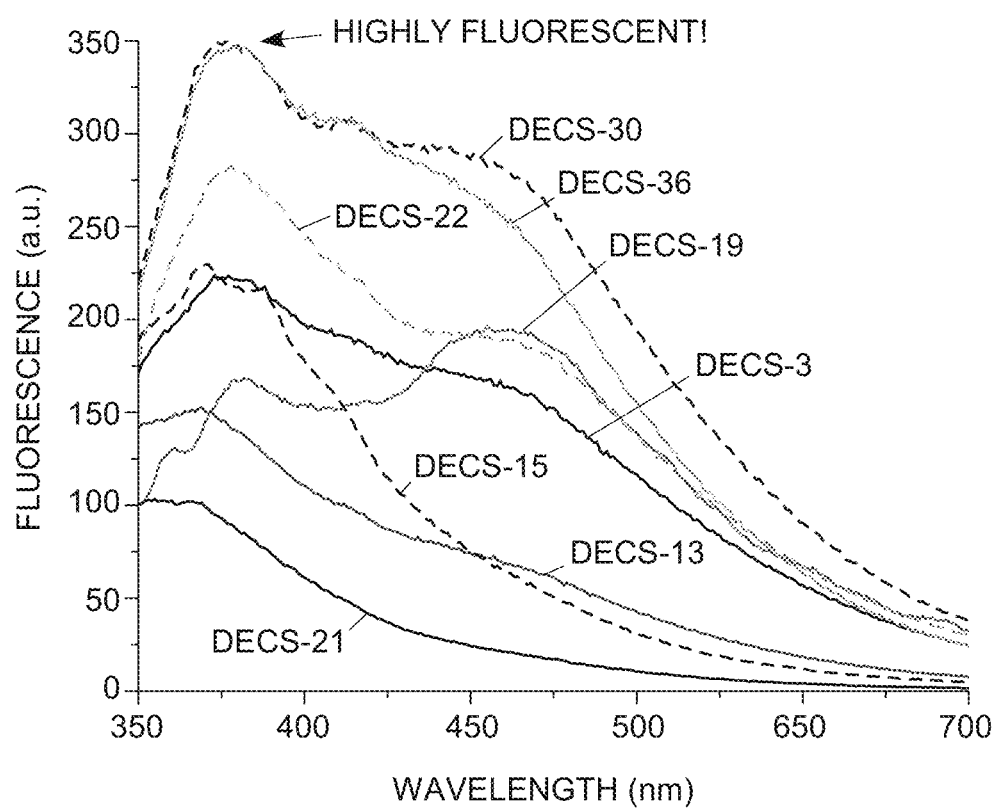
FIG. 2 is a graph depicting extensive coal dissolution demonstrated by fluorescence analysis.

The process was demonstrated for both anthracitic and bituminous coal feedstocks which account for >45% of the coal found in the US. The process was demonstrated to be economically viable by techno-economic analysis. The HCCM product has also been demonstrated in battery electrode formulations, Multiple anthracitic and bituminous coal feedstocks were demonstrated to be suitable as feedstocks. All coal samples showed extensive dissolution to produce a solubilized product with high content of polycyclic aromatic compounds as determined by fluorescence measurements as shown in FIG. 2.

Figure 3:
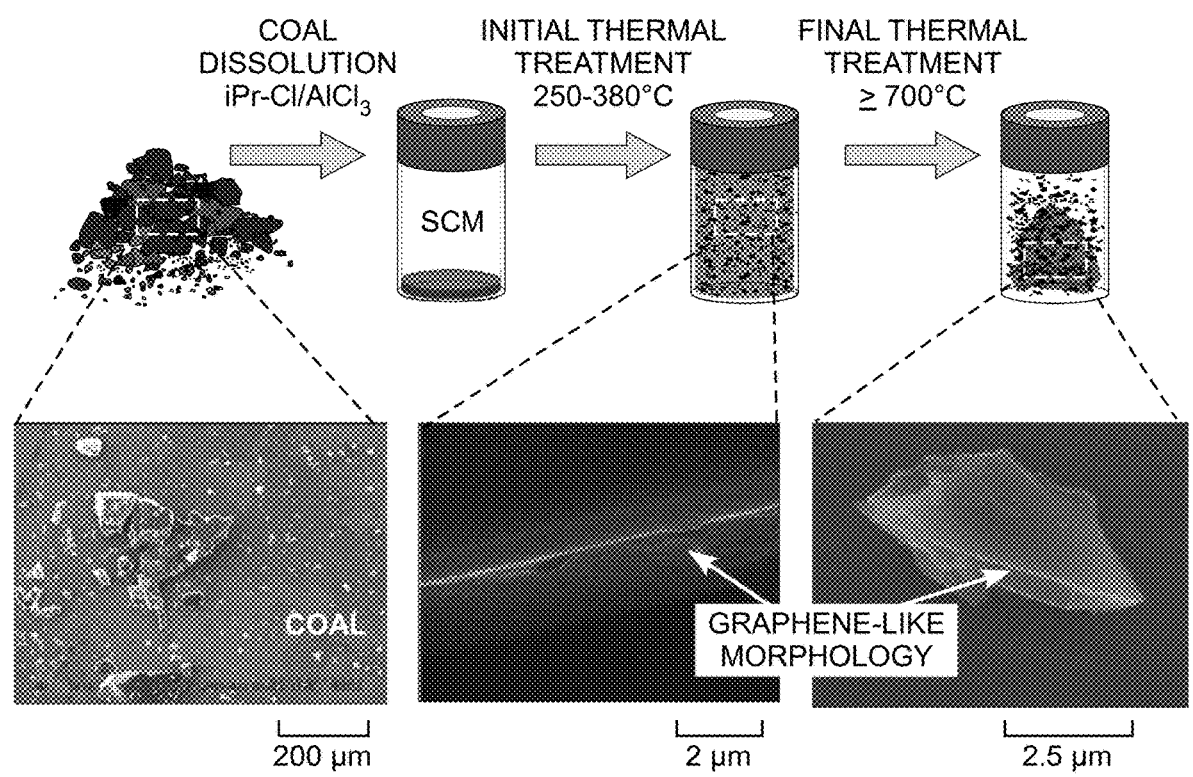
FIG. 3 is a compliation of schematics of materials and SEM analyses.

The coal dissolution processes may be optimized to produce solubilized coal materials (SCMs) with high yields (>75%, g/g basis). Robust pyrolytic processes were also developed and optimized to produce high conductivity carbon materials (HCCMs) from SCMs. The pyrolytic processes produce gaseous byproducts (e.g., methane) that can be used as low emission fuels. Examples of schematics of materials and SEM analyses of the process steps to convert the coal to the final graphene-like HCCM product are shown in FIG. 3, fluorescence measurements and proton nuclear magnetic resonance ($^1$H-NMR) analysis indicated the chemical changes associated with isopropylation and extension of the aromatic system.

Key properties of the HCCMs demonstrated the suitability of the HCCMs for electrochemical (e.g., battery) applications: (1) a graphene-like morphology as proven by SEM analysis; (2) a low mineral content as proven by ICP-OES measurements (e.g., Fe<100 ppm) and (3) High surface area as proven by BET analysis (e.g., >50 $m^2/g$).

Figure 4A:
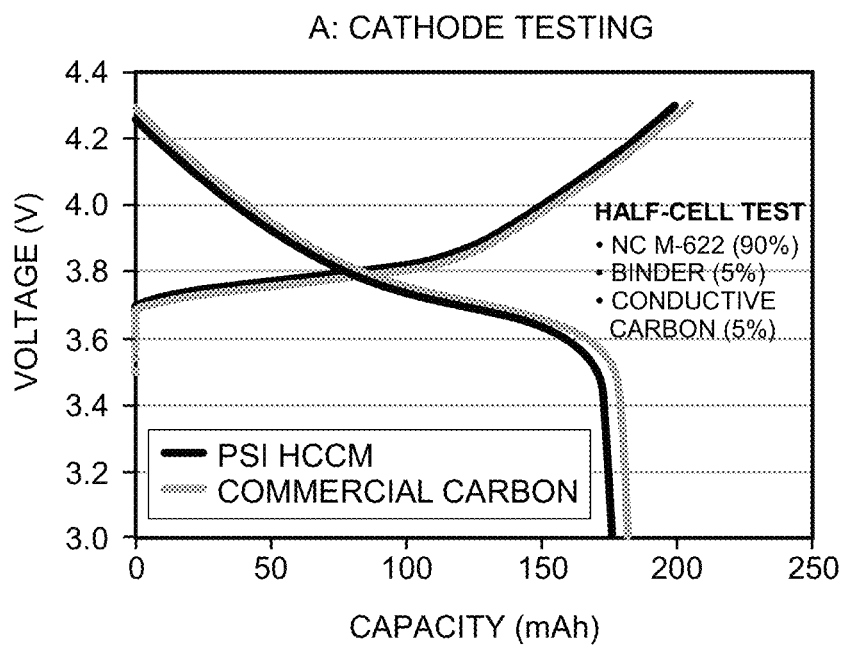
FIGS. 4A-4B are graphs depicting a performance evaluation of HCCMs materials in battery electrode formulations.
Figure 4B:
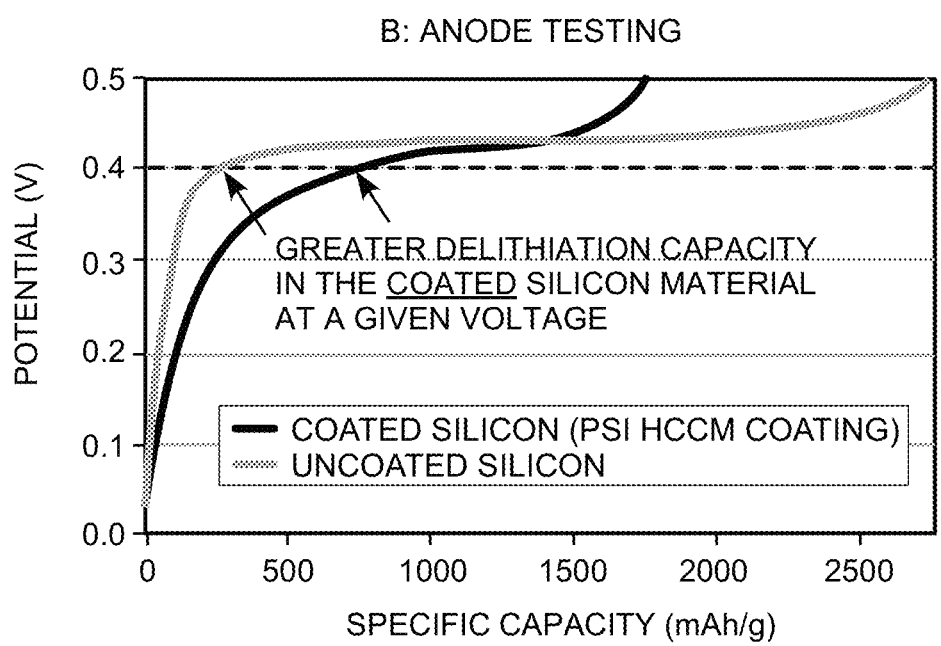

Also demonstrated were battery electrodes produced with HCCM using industry established procedures, a requirement for wide-scale adoption. Performance analysis of both cathode and anode HCCM formulations demonstrated the feasibility of using these materials in state-of-the art batteries. NCM 622 cathode formulations showed comparable performance to formulations that use commercial conductive carbons as shown in FIG. 4A. In silicon composite anode formulations, the PSI HOCM silicon exhibited an improved voltage profile upon delithiation compared to an uncoated control as shown in FIG. 4B.

A preliminary techno-economic analysis (TEA) was performed to assess the commercial feasibility of the processes depicted in FIG. 1. The results of the TEA indicated that the overall process can result in an economically viable commercial operation on scale-up. A detailed analysis based on Aspen simulations indicated that process scale is a main contributor to the process economics. A 5× reduction in the payback period was estimated upon an increase of the capacity from 1 tonne-per-day (tpd) to 10 tpd.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A method of producing carbon material from coal, the method comprising:
    subjecting the coal to a dissolution process to produce a solubilized coal material; and
    subjecting the solubilized coal material to a pyrolysis process to produce carbon material, the pyrolysis process including heating the solubilized coal material to between 250° C. and 380° C. for 1-8 hrs and then heating the solubilized coal material to temperatures as low as 700° C. for at least 1 hr.

2. The method of claim 1 in which the dissolution process includes adding one or more reagents, solvents and/or catalysts to the coal.

3. The method of claim 2 in which the reagent/solvent includes iPrCl and/or the catalyst includes $AlCl_3$.

4. The method of claim 1 in which the dissolution process produces a mineral fraction in addition to the solubilized coal material.

5. The method of claim 1 in which the pyrolysis process includes a gas combustor for applying heat to the solubilized coal material.

6. The method of claim 5 in which the pyrolysis process produces a gas in addition to the carbon material, said gas fed to the combustor as a fuel.

7. The method of claim 1 in which the carbon material has a graphene-like morphology.

8. A method of producing carbon material from coal, the method comprising:

subjecting the coal to a dissolution process to produce a solubilized coal material; and subjecting the solubilized coal material to a pyrolysis process to produce the carbon material and a fuel gas used in the pyrolysis process to heat the solubilized coal material, the pyrolysis process including heating the solubilized coal material to between 250° C. and 380° C. for 1-8 hrs and then heating the solubilized coal material to temperatures as low as 700° C. for at least 1 hr.

9. The method of claim 8 in which the dissolution process includes adding one or more reagents, solvents and/or catalysts to the coal.

10. The method of claim 9 in which the reagent/solvent includes iPrCl and/or the catalyst includes $AlCl_3$.

11. The method of claim 8 in which the dissolution process produces a mineral fraction in addition to the solubilized coal material.

12. The method of claim 8 in which the pyrolysis process includes a gas combustor utilizing said fuel gas for applying heat to the solubilized coal material.

13. The method of claim 8 in which the carbon material has a graphene-like morphology.

* * * * *